US006884750B2

(12) United States Patent
Kim et al.

(10) Patent No.: US 6,884,750 B2
(45) Date of Patent: Apr. 26, 2005

(54) CHIRAL SALEN CATALYST AND METHODS FOR THE PREPARATION OF CHIRAL COMPOUNDS FROM RACEMIC EPOXIDES BY USING NEW CATALYST

(75) Inventors: Geon Joong Kim, Seoul (KR); Ho Seong Lee, Daejeon (KR); Ho Cheol Kim, Jeollabuk-do (KR); Jin Won Yun, Jecheon-si (KR); Seong Jin Kim, Daejeon (KR)

(73) Assignee: RS Tech Corp. (KR)

( * ) Notice: Subject to any disclaimer, the term of this patent is extended or adjusted under 35 U.S.C. 154(b) by 29 days.

(21) Appl. No.: 10/297,164
(22) PCT Filed: Jun. 26, 2002
(86) PCT No.: PCT/KR02/01219
§ 371 (c)(1),
(2), (4) Date: Dec. 2, 2002
(87) PCT Pub. No.: WO03/002582
PCT Pub. Date: Jan. 9, 2003

(65) Prior Publication Data
US 2003/0216250 A1 Nov. 20, 2003

(30) Foreign Application Priority Data
Jun. 27, 2001 (KR) .................................... 2001-0037081
Jun. 24, 2002 (KR) .................................... 2002-0035467

(51) Int. Cl.$^7$ .............................................. B01J 31/00
(52) U.S. Cl. ...................... 502/150; 502/102; 502/104; 502/123
(58) Field of Search ............................. 502/150, 102, 502/104, 123

(56) References Cited

U.S. PATENT DOCUMENTS

| | | | |
|---|---|---|---|
| 5,618,957 A | * | 4/1997 | Hubner et al. ................. 556/32 |
| 5,637,739 A | | 6/1997 | Jacobsen et al. |
| 5,663,393 A | * | 9/1997 | Jacobsen et al. .............. 556/45 |
| 5,665,890 A | * | 9/1997 | Jacobsen et al. ............ 549/230 |
| 5,929,232 A | | 7/1999 | Jacobsen et al. |
| 6,262,278 B1 | * | 7/2001 | Jacobsen et al. ............ 549/230 |
| 6,448,414 B1 | * | 9/2002 | Jacobsen et al. ............ 549/230 |
| 6,521,561 B1 | * | 2/2003 | Jacobsen et al. ............ 502/162 |
| 6,720,434 B1 | * | 4/2004 | Kim et al. ................... 549/523 |
| 2004/0054204 A1 | * | 3/2004 | Kim et al. |

* cited by examiner

*Primary Examiner*—Mark L. Bell
*Assistant Examiner*—Jennine Brown
(74) *Attorney, Agent, or Firm*—Muserlian, Lucas & Mercanti, LLP

(57) ABSTRACT

The present invention relates to new chiral salen catalysts and methods for the preparation of chiral compounds from racemic epoxides by using new catalyst. More particularly, the present invention is to provide novel chiral salen catalysts and their uses for producing chiral compounds having high optical purity to be used as raw materials for preparing chiral medicines or food additives in a large scale economically, wherein the chirl salen catalyst having a particular molecules structure can be reused continuously without any activating process of used catalysts and cause no or little racemization after the reaction is completed because it maintains its catalytic activity after the reaction process.

31 Claims, 7 Drawing Sheets

CHIRAL SALEN CATALYST AND METHODS FOR THE PREPARATION OF CHIRAL COMPOUNDS FROM RACEMIC EPOXIDES BY USING NEW CATALYST

This patent application claims a benefit of priority from Korean Patent Application No. 2001/0037081 filed Jun. 27, 2001 and Korean Patent Application No. 2002/0035467 filed Jun. 24, 2002, through PCT Application Ser. No. PCT/KR02/01219 filed Jun. 26, 2002, the contents of each of which is incorporated herein by reference.

TECHNICAL FIELD

The present invention relates to new chiral salen catalysts and methods for the preparation of chiral compounds from racemic epoxides by using new catalyst. More particularly, the present invention is to provide novel chiral salen catalysts and their uses for producing chiral compounds having high optical purity to be used as raw materials for preparing chiral medicines or food additives in a large scale economically, wherein the chiral salen catalyst having a particular molecule structure can be reused continuously without any activating process of used catalysts and cause no or little racemization after the reaction is completed, because it maintains its catalytic activity after the reaction process.

BACKGROUND ART

Chiral expoxides or chiral 1,2-diols have been widely used to prepare pharmaceuticals, agriculture products and food additives having optical properties (U.S. Pat. No. 5,071,868; *Tetrahedron Lett., Vol.* 28, No. 16, 1783, 1987; *J. Org. Chem., Vol.* 64, 8741, 1999). Even if these chiral epoxides or chiral 1,2-diols having high optical purity are very useful compounds industrially, use of these compounds has been restricted because the preparation of such compounds is too difficult to produce in a large scale with low manufacturing price and the optical purity, which is an important factor in determining the quality of products, is insufficient. Because enantiomers have radically different biological activity, the FDA has stated that "compounds having the same structure and composition are treated as different compounds if they are optical stereoisomers" so that pharmaceutical feedstocks, and fine chemical feedstocks must be produced with utmost concern for the chirality of the molecules. Generally, the chirality of the molecules having higher than 99.5% is acceptable for the pharmaceutical feedstocks, fine chemical feedstocks, and foods additives.

A preparation method of chiral epichlorohydrins as one of chiral expoxides is disclosed using microorganism in EP Patent No. 431,970 and JP Patent Publication Nos. 90-257895 and 94-211822. However, it is not recommended because the productivity is low and it, further, requires more than two-step process. Another preparation method of chiral epichlorohydrins from chiral sulfonyloxyhaloalcohol derivatives obtained from mannitol derivatives is disclosed in U.S. Pat. No. 4,408,063; and *J. Org. chem., Vol* 43, 4876, 1978. Another preparation method of chiral epichlorohydrins from 3-chloro-1,2-propanediol is also disclosed in *Syn. Lett No.* 12, 1927, 1999. However, these processes are required multi-step syntheses, so that they are also deficient to use for the industrial purpose.

Methods for preparing chiral expoxides generally use a chiral catalyst having stereoselectivity which hydrolyzes stereoselectively only one isomer from racemic epoxides mixed 50 and 50 of each isomer and leaves the un-hydrolyzed isomer in the reaction medium. However, the chiral catalyst used for said stereoselective hydrolysis is required to be economical, have high stereoselectivity and be re-usable without employing activation process, thus suitable for the industrial purpose.

Stereoselective hydrolyses of chiral epoxides using chiral salen catalyst as a chiral catalyst are recently disclosed in *Science*, Vol. 277, 936, 1997; U.S. Pat. Nos. 5,665,890, 5,929,232, 5,637,739, and 5,663,393; and WO00/09463 and WO91/14694. It has been reported that the use of chiral salen catalyst provides higher yield with higher optical purity compared to uses of other chiral catalysts.

However, it is reported that after hydrolysis of racemic epoxide using said chiral salen catalyst, the product chiral epoxide is racemized as time goes in pages 86–87 of WO00/09463. The hydrolysis of racemic epoxides is performed by employing said chiral catalyst and water to hydrolyze stereoselectively only one isomer from R and S isomers. The unhydrolyzed chiral epoxide is isolated from the reaction medium. During the purification process to isolate the desired chiral epoxide, the racemization is caused by the side reaction of hydrolyzed product (chiral 1,2-diol) due to instability of the chiral salen catalyst. Therefore, this method also has a fatal drawback for mass-production of chiral compounds.

When this hydrolysis is performed for mass production, the racemization of the product becomes deepened since it takes longer to perform the distillation to obtain the desired product, thus resulting in decrease of optical purity of the chiral epoxide. Therefore, the use of chiral salen catalyst in the production of chiral epoxides is limited for the above-mentioned reasons.

Further, when conventional chiral salen catalysts are reused, it requires an activation process after each use because activities thereof are rapidly decreased. Even if the catalyst is activated after used, the optical activity of the product prepared by using reused catalyst is remarkably lower than that of the product prepared by using fresh catalyst. Thus, there is limited to reuse. Such problems increase the manufacturing price of producing chiral epoxides.

Consequently, demand to produce chiral compounds such as chiral epoxides or chiral 1,2-diols efficiently and economically has been highly increased with the importance of such compounds to prepare pharmaceuticals and agriculture products.

Especially, in preparing chiral medicines or chiral intermediates, it is very difficult or almost impossible to further increase the optical purity of the same product once it is prepared, or to remove undesired optical stereoisomer, unlike the chemical purity. Thus, the technique for preparing chiral compounds having a high optical purity, which is sufficient for the materials for medicines, in the present invention is distinct, efficient and different from the preparation techniques which only focus on heightening the ratio of the desired stereoisomer in the racemic compounds.

DISCLOSURE OF THE INVENTION

The present invention has been resulted from resolving deactivation of chiral catalysts and racemization of chiral products because conventional chiral salen catalysts having an acetate group (OAc) or a halogen group loose their activities or functional groups such as acetate groups or halogen groups thereof, which cause racemization of chiral products. In other words, it is important to select appropriate counterions bonded to the center metal in chiral salen catalysts used in stereoselective hydrolyses of racemic epoxides. For example, chiral catalysts having nucleophilic groups such as acetate and halogen group as counterions deteriorate the optical purity of products since these counterions have weak bonds to the center metal and some dissociated counterions participate in the reverse reaction of the hydrolyzed product, 1,2-diols, resulting in the racemization of the chiral products and further, counterions bonded weakly to the center metal in chiral catalysts can be dissociated during the reaction process, resulting in diminished catalytic activity.

The present invention provides novel chiral salen catalysts comprising one molecule of $LQ_3$ wherein L is boron (B) or aluminium (Al); and Q is a halogen atom selected from the group consisting of F, Cl, Br and I, and two molecules of chiral salen ligands. The chiral salen catalyst of the present invention has an activating group of $LQ_3$, most preferably $BF_3$, having no nucleophilic property, which does not affect racemization of chiral epoxides and loose its activity after the reaction is completed.

Accordingly, an object of the present invention is to provide chiral salen catalysts which not only maintain its excellent activity after used, thus being used continuously without activation process and simplifing the manufacturing process but also contribute to produce high optical purity of the product without racemization.

Another object of the present invention is to provide an economical process for preparing chiral epoxides and chiral 1,2-diols to be used as raw materials for chiral medicines or food additives from racemic epoxides by using said chiral salen catalyst in high yield and high optical purity.

BEST MODE FOR CARRYING OUT THE INVENTION

Figure 1:
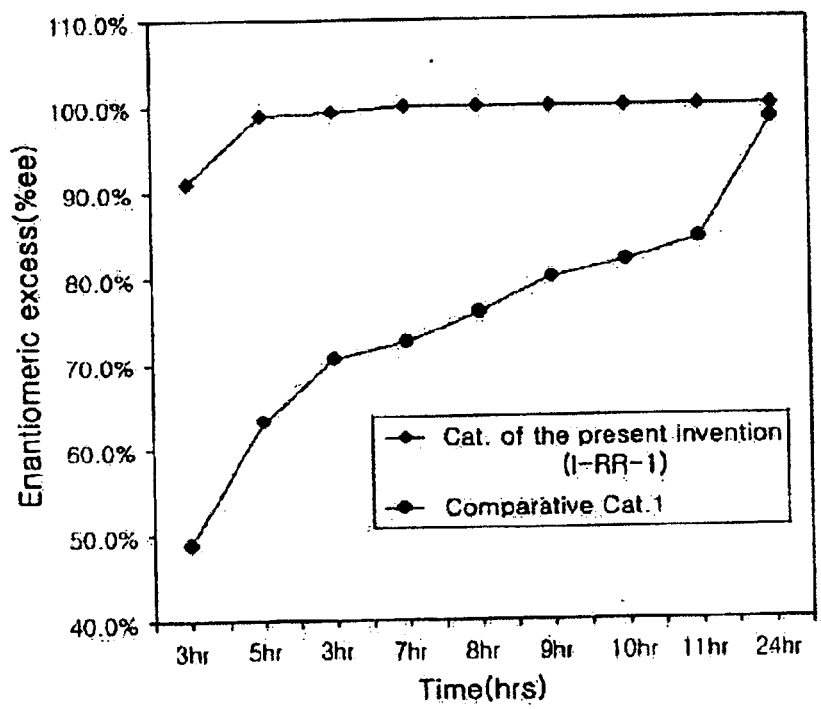
FIG. 1 is a graph comparing the difference in the reaction rate by employing a representative chiral salen catalyst (I-RR-1) of the present invention and a comparative catalyst 1 having the same 3-dimensional structure as the conventional catalyst over reaction time.

The present invention is to provide new structural chiral salen catalysts comprising two molecules of chiral salen ligands and one molecule of $LQ_3$ expressed by the following formula 1,

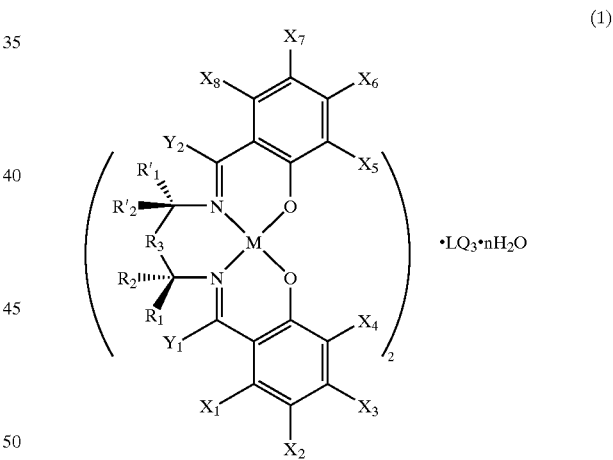

(1)

wherein $R_1$, $R_2$, $R'_1$, $R'_2$, $X_1$, $X_2$, $X_3$, $X_4$, $X_5$, $X_6$, $X_7$, $X_8$, $Y_1$ and $Y_2$ are independently H, $C_1$–$C_6$ alkyl group, $C_2$–$C_6$ alkenyl group, $C_2$–$C_6$ alkynyl group, $C_1$–$C_6$ alkoxy group, halogen atom, hydroxy group, amino group, thiol group, nitro group, amine group, imine group, amide group, carbonyl group, carboxy group, silyl group, ether group, thio ether group, seleno ether group, ketone group, aldehyde group, ester group, phosphoryl group, phosphonate group, phosphine group, sulfonyl group or $(CH_2)k$-$R_4$, wherein, $R_4$ is phenyl, cycloalkyl, cycloalkenyl, heterocycle or polycycle, and k is an integer of 0 to 8, or any two or more neighboring $R_1$, $R_2$, $R'_1$, $R'_2$, $X_1$, $X_2$, $X_3$, $X_4$, $X_5$, $X_6$, $X_7$, $X_8$, $Y_1$ and $Y_2$ form a ring of a carbocycle or heterocycle comprising 4 to 10 atoms; $R_3$ is a direct bond, —$CH_2$—, —$CH_2CH_2$—, —NH—, —O—, or —S—; M is a metal atom selected from Co, Cr, Mn, Fe, Mo and Ni; L is B or Al, preferably B; Q is a halogen atom chosen from F, Cl, Br, and I, preferably F or Cl, and most preferably F; and n is an integer of 0 to 4.

Preferably, $X_1$, $X_2$, $X_3$, $X_4$, $X_5$, $X_6$, $X_7$, $X_8$, $Y_1$ and $Y_2$ are independently selected from a group of H, $C_1$–$C_6$ alkyl group and $C_1$–$C_6$ alkoxy group, and most preferably, $X_1$, $X_2$, $X_3$, $X_4$, $X_5$, $X_6$, $X_7$ and $X_8$ are independently H or t-butyl group, and both $Y_1$ and $Y_2$ are H.

In the above formula 1, $R_1$ and $R'_1$ may be the same or different, preferably the same; $R_2$ and $R'_2$ may be the same or different, preferably the same. When $R_1$ is identical with $R'_1$, and $R_2$ is identical with $R'_2$, the chiral center forms RR or SS configurations. Preferable examples of $R_1$, $R_2$, $R'_1$ and $R'_2$ are as follows; $R_1$ and $R_1'$ are combined to form a $C_4$–$C_6$ carbocycle, and $R_2$ and $R'_2$ are H, $C_1$–$C_6$ alkyl group or $C_1$–$C_6$ alkoxy group; or $R'_1$ and $R_1$ are H, $C_1$–$C_6$ alkyl group or $C_1$–$C_6$ alkoxy group, and $R_2$ and $R'_2$ are combined to form a $C_4$–$C_6$ carbocycle.

Preferable examples of the metal atom include Mn and Co, most preferably Co.

Examples of $LQ_3$ may include $BF_3$, $BCl_3$, $BBr_3$, $BI_3$ and $AlCl_3$. In accordance with the present invention, $BF_3$ displayed the most excellent results.

In the stereoselective hydrolysis of racemic epoxides to chiral epoxides or chiral 1,2-diols, the present invention performs in the presence of said chiral salen catalyst of formula 1.

The present invention is described in detail as set forth hereunder. The present invention relates to the process for preparing optically pure epoxides or 1,2-diols from racemic epoxides by stereoselective hydrolysis in the presence of the chiral salen catalyst of formula 1 in high yield, where the catalyst can be reused continuously without an activation process after used and does not affect racemization of the produced products.

The chiral salen catalyst of the present invention comprises one molecule of activating group of $LQ_3$ having no nucleophilic property, preferably $BF_3$, and two molecules of chiral salen ligands to prevent from the racemization of the chiral product, thus resulting high optical purity and high yield and further, to prevents the decrease of catalyst activation caused by the dissociation of counterions.

In the chiral salen catalysts of formula 1 of the present invention, the catalysts of formula 1a and formula 1b are preferable,

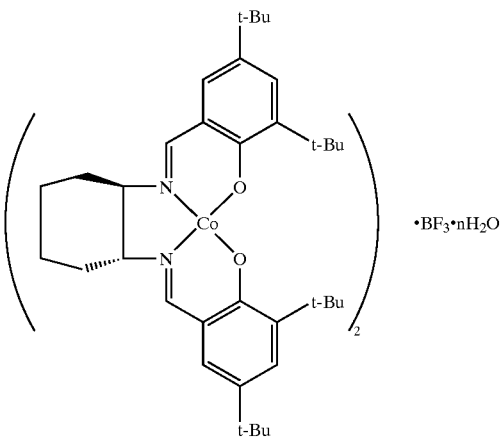

[formula 1a]

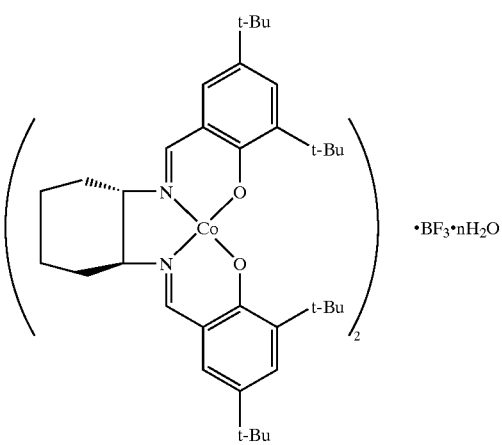

[formula 1b]

wherein n is an integer of 0 to 4.

As shown in the following scheme 1, the chiral salen catalyst of formula 1 in accordance with the present invention can be prepared by first reacting the compound of formula 2 with metal acetate in a proper organic solvent, followed by filtering it to obtain a solid compound of formula 3, and then reacting the resulted compound with $LQ_3$ (for example, $BF_3$, $BCl_3$, $BBr_3$, $BI_3$ or $AlCl_3$) in a proper organic solvent.

[Scheme 1]

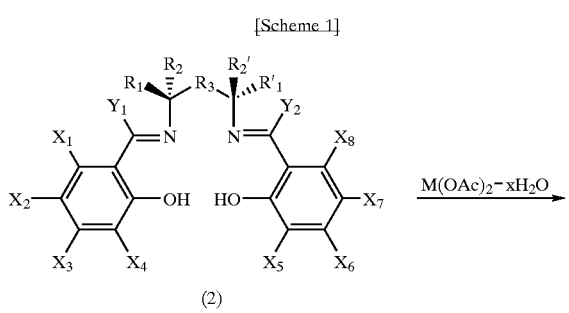

(2)

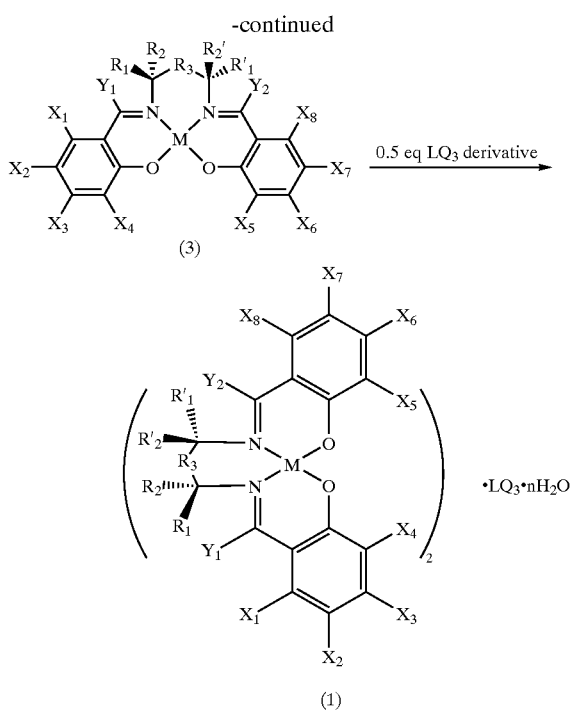

wherein $R_1$, $R_2$, $R'_1$, $R'_2$, $R_3$, $X_1$, $X_2$, $X_3$, $X_4$, $X_5$, $X_6$, $X_7$, $X_8$, $Y_1$, $Y_2$, M, n, L and Q are as defined in the above formula 1.

The compound of formula 2 used in the preparation of the chiral salen catalyst of formula 1 can be easily purchased or prepared by a known method disclosed in *J. Org. Chem.*, Vol. 59, 1939, 1994. $LQ_3$ such as $BF_3$, $BCl_3$, $BBr_3$, $BI_3$ or $AlCl_3$ can be added in various forms including a hydrated form or a complex. For example, boron trifluorides include boron trifluoride dihydrate, boron trifluoride-acetic acid complex, boron trifluoride t-butyl methyl etherate, boron trifluoride dibutyl etherate, boron trifluoride diethyl etherate, boron trifluoride dimethyl etherate, boron trifluoride-ethylamine complex, boron trifluoride-methanol complex, boron trifluoride-methyl sulfide complex, boron trifluoride-phenol complex, boron trifluoride-phosphoric acid complex, boron trifluoride-propanol complex, and boron trifluoride-tetrahydrofuran complex.

The chiral salen catalyst of formula 1 can be used as it is or by immobilizing on the stationary phase such as zeolite and silica gel. Such immobilization can be obtained by physical absorption or by chemical bonding using rinkers or spacers.

The mechanism of preparing chiral epoxides or chiral 1,2-diols from racemic epoxides in the presence of the chiral salen catalyst of formula 1 by stereoselective hydrolysis is shown in Scheme 2,

[Scheme 2]

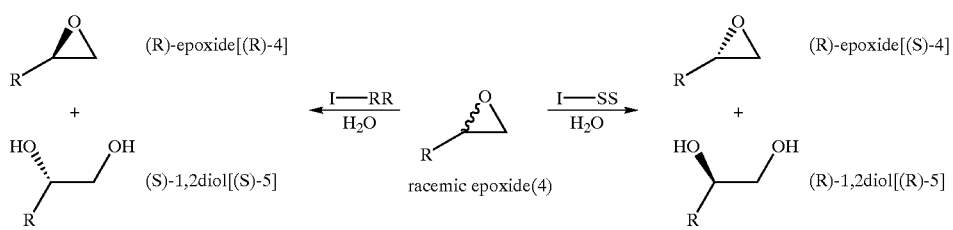

wherein R is $C_1$–$C_{10}$ alkyl group, $C_2$–$C_6$ alkenyl group, $C_2$–$C_6$ alkynyl group, $C_3$–$C_8$ cycloalkyl group, $C_1$–$C_{10}$ alkoxy group, phenyl group, carbonyl group, carboxy group, ketone group, aldehyde group, ester group, phosphoryl group, phosphonate group, phosphine group, sulfonyl group or $(CH_2)_I$—$R_5$ (wherein, $R_5$ is $C_2$–$C_6$ alkenyl group, $C_2$–$C_6$ alkynyl group, $C_2$–$C_6$ alkoxy group, phenyl, cycloalkyl, cycloalkenyl, heterocycle, polycycle, halogen atom, hydroxy group, amino group, thiol group, nitro group, amine group, imine group, amide group, carbonyl group, carboxy group, silyl group, ether group, thio ether group, seleno ether group, ketone group, aldehyde group, ester group, phosphoryl group, phosphonate group, phosphine group, silfonyl group and I is an integer of 0 to 8); I-RR is the chiral salen catalyst having an RR configuration among the chiral salen catalysts of formula 1; I-SS is the chiral salen catalyst having an SS configuration among the chiral salen catalysts of formula 1.

The stereoselective hydrolysis of scheme 2 comprises steps of reacting racemic epoxide of formula 4 with water in the presence of chiral salen catalyst of formula 1; selectively hydrolyzing either (R)-epoxide or (S)-epoxide; and subsequently separating the unhydrolyzed epoxide from the hydrolyzed epoxide. The stereoselective hydrolysis of Scheme 2 is described in more detail hereinafter.

Racemic epoxide compound of formula 4, 0.3–0.8 equivalents of water and over 0.001 mol % of a chiral salen catalyst of formula 1, preferably 0.1–5 mol %, are reacted at a temperature of −10 to 50° C., preferably 5 to 25° C. After the reaction is completed, the unhydrolyzed epoxide is separated out by fractional distillation or thin film evaporator at a low temperature of −10 to 50° C. and the chiral 1,2-diol is extracted with an organic solvent from the residue. The recovered catalyst is re-used for hydrolysis of fresh racemic epoxide to produce chiral epoxide or chiral 1,2-diol without any activation process.

In the stereoselective hydrolysis according to the present invention, the chiral salen catalysts of formula 1 having RR configuration (hereafter referring to as "I-RR") produce (R)-epoxides or (S)-1,2-diols, while the chiral salen catalysts of formula 1 having SS configuration (hereafter referring to as "I-SS") produce (S)-epoxides or (R)-1,2-diols.

FIG. 1 is a graph comparing the difference in the reaction rate by employing a representative chiral salen catalyst (I-RR-1) of the present invention and a comparative catalyst 1 having the same 3-dimensional structure as the conventional catalyst over reaction time. According to FIG. 1, the catalyst of the present invention has a reaction rate much higher than that of the comparative catalyst 1.

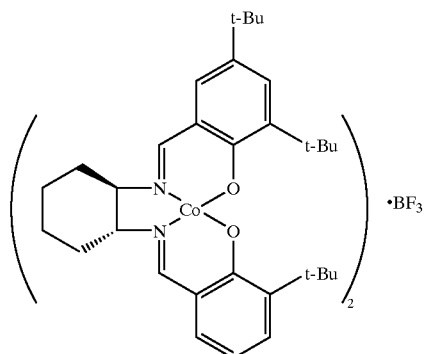

Cat. of the present invention (I-RR-1)

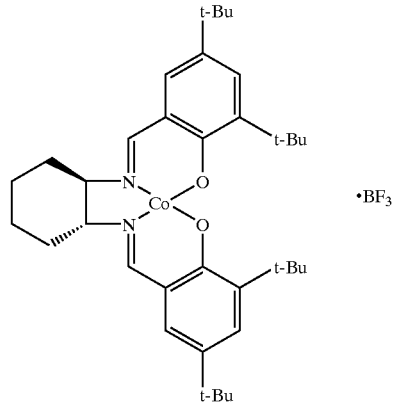

Comparative cat. 1

Figure 2:
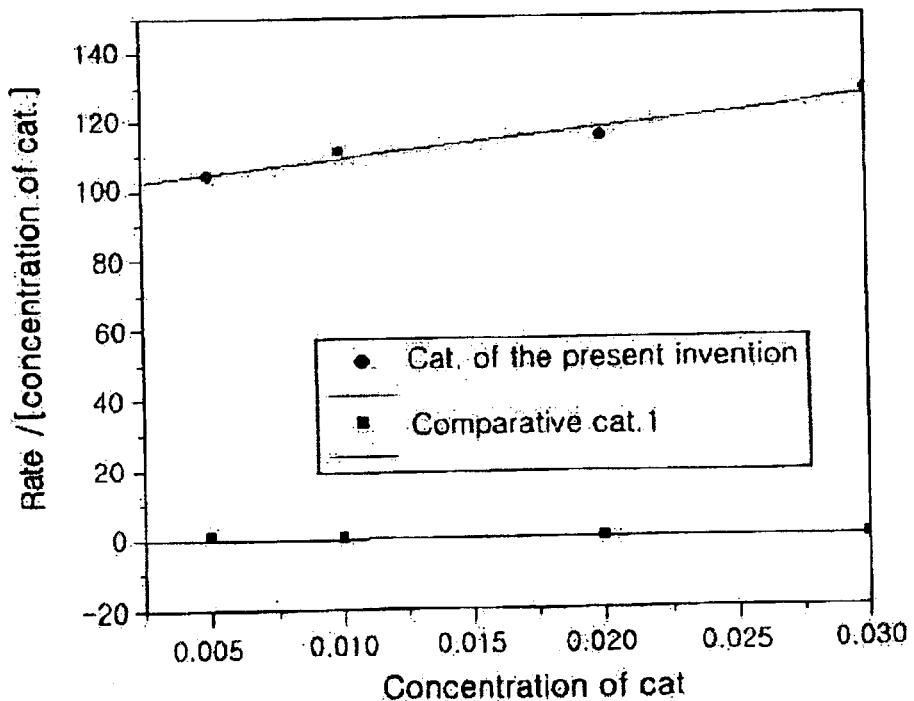
FIG. 2 is a graph comparing the difference in kinetics of the reaction by employing a representative chiral salen catalyst (I-RR-1) of the present invention and a comparative catalyst 1 having the same 3-dimensional structure as the conventional catalyst.

FIG. 2 is a graph comparing the difference in kinetics of the reaction by employing a representative chiral salen catalyst (I-RR-1) of the present invention and a comparative catalyst 1 having the same 3-dimensional structure as the conventional catalyst. According to FIG. 2, rate data obtained with the representative chiral salen catalyst (I-RR-1) of the present invention has a linear correlation with positive slope and nonzero Y-intercept, wherein the X axis is the concentration of the catalyst and the Y axis is the value of the reaction rate divided by the concentration of the catalyst. Indication of this graph is consistent with participation of both intramolecular pathway and intermolecular pathway as shown in the following Equation 1.

$$\text{Rate} \propto k_{intra}[\text{concentration of cat.}] + k_{inter}[\text{concentration of cat.}]^2 \quad \text{[Equation 1]}$$

Especially, the fact that the chiral salen catalyst affects an intramolecular pathway indicates that the configuration thereof has a sandwich configuration having $BF_3$ at the center.

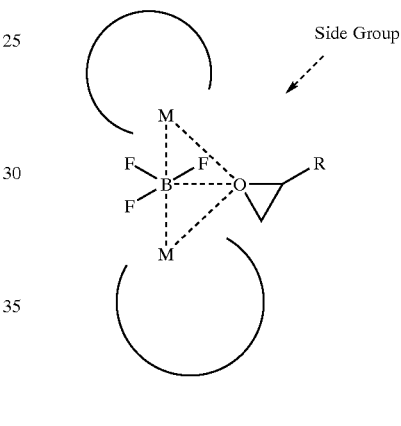

Figure 3:
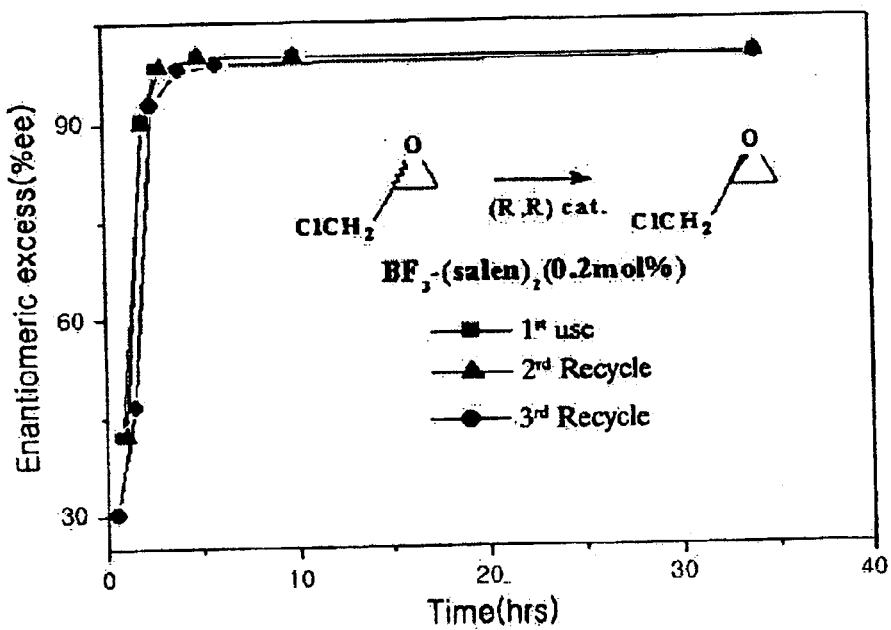
FIG. 3 is a graph showing the optical purity of chiral products produced by employing a representative chiral salen catalyst (I-RR-1) of the present invention according to the number of times it is used.
Figure 4:
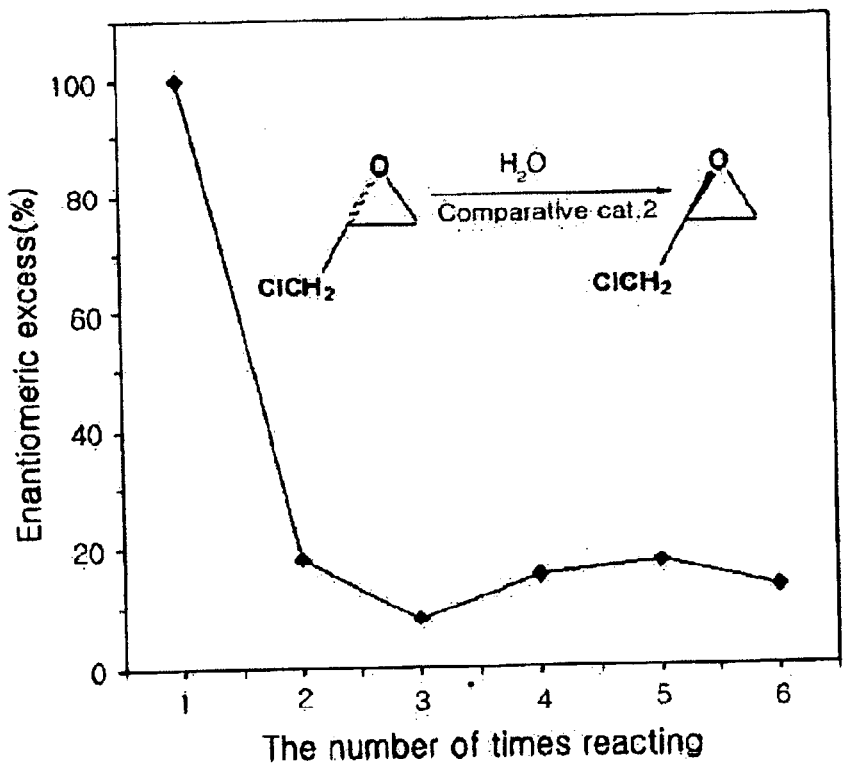
FIG. 4 is a graph showing the optical selectivity of a conventional chiral salen catalyst having an acetate group (OAc), comparative catalyst 2, according to the number of times it is used.

FIG. 3 is a graph showing the reaction rate by employing a representative chiral salen catalyst (I-RR-1) of the present invention according to the number of times it is used and FIG. 4 is a graph showing the reaction rate by employing a conventional chiral salen catalyst having an acetate group (OAc), comparative catalyst 2, according to the number of times it is used.

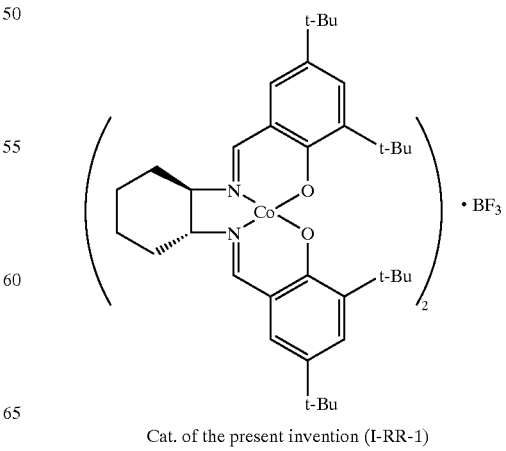

Cat. of the present invention (I-RR-1)

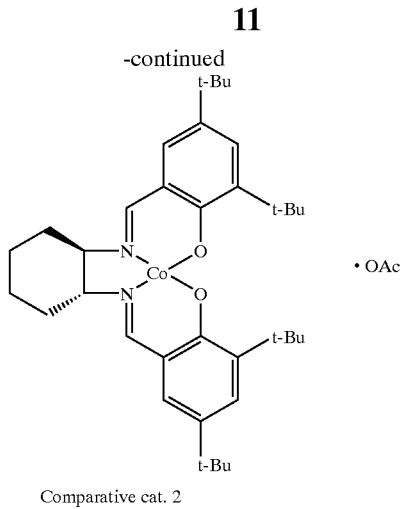

Comparative cat. 2

According to FIGS. 3 and 4, it is noted that the use of the chiral salen catalyst of the present invention exhibits higher optical purity (over 99% ee) of the chiral epoxides than that of the comparative catalyst 2 having an acetate group. It is further proved that the chiral salen catalyst of the present invention can be reused continuously without any activation process, while the conventional chiral salen catalyst having an acetate group has to be activated with acetic acid after each use because it looses its catalytic activity and the reaction using recovered catalyst takes much longer to obtain over 99% ee of optical purity of the product than that using a fresh catalyst (see Table 1).

Figure 5:
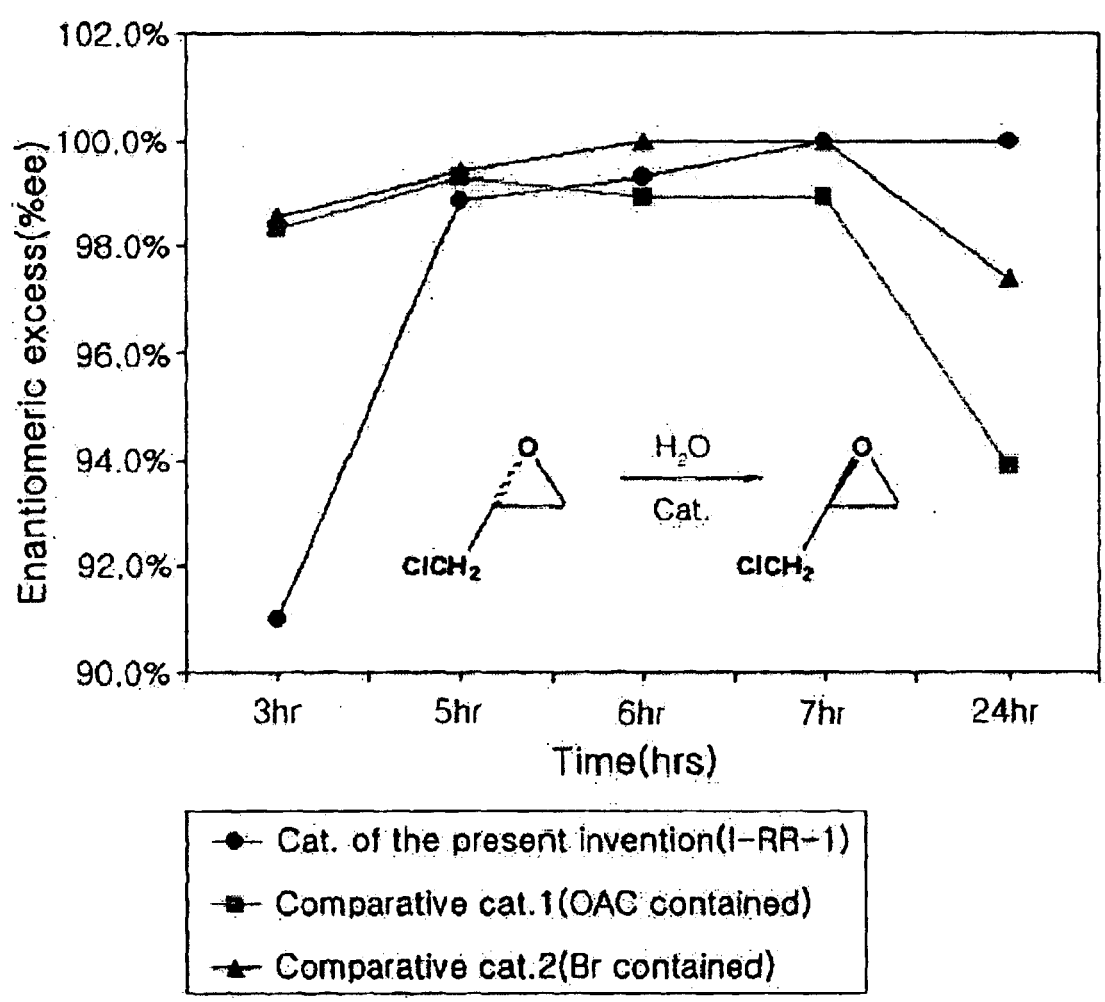
FIG. 5 is a graph comparing the difference in degree of the racemization of chiral epoxides produced by employing a representative chiral salen catalyst (I-RR-1) of the present invention, a chiral salen catalyst having an acetate group (comparative catalyst 2), and a chiral salen catalyst having a bromide group (Br, comparative catalyst 3) over reaction time.

FIG. 5 is a graph comparing the difference in degree of the racemization of chiral epoxides produced by employing a representative chiral salen catalyst (I-RR-1) of the present invention, a chiral salen catalyst having an acetate group (comparative catalyst 2), and a chiral salen catalyst having a bromide group (Br, comparative catalyst 3) over reaction time.

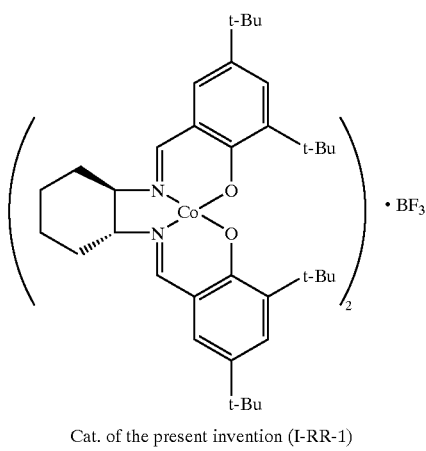

Cat. of the present invention (I-RR-1)

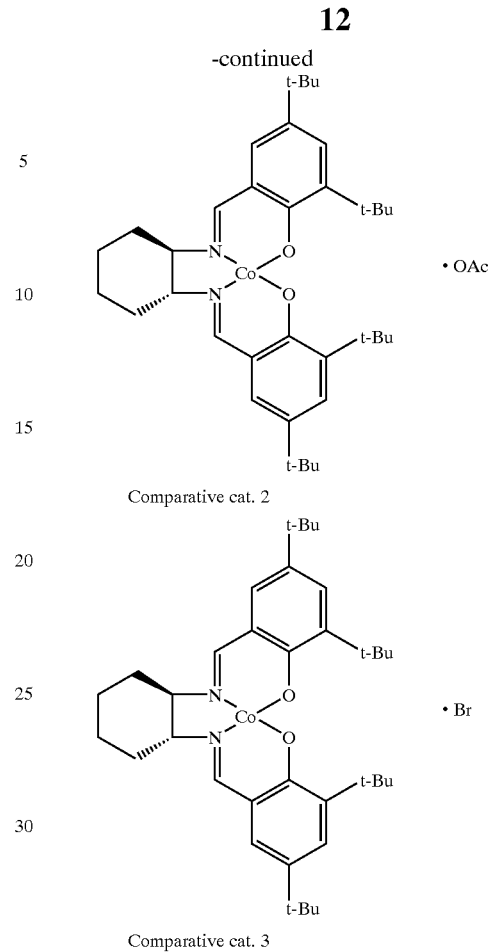

Comparative cat. 2

Comparative cat. 3

In FIG. 5, when the chiral salen catalyst of the present invention is used, there is no or little of racemization over reaction time, while when conventional chiral salen catalyst having an acetate group (OAc, comparative catalyst 2 or conventional chiral salen catalyst having a bromide group (Br, comparative catalyst 3) is used, the degree of racemization becomes higher over reaction time, resulting in lowering optical purity of the corresponding product because the conventional chiral salen catalysts contain counterions having a nuclophilic property. In the mass production of chiral epoxides, it will take longer reaction time to distill the desired product. Therefore, it is expected that use of the chiral salen catalyst of the present invention contributes to produce optically pure chiral epoxide after purification process, while use of the comparative catalyst 2 or 3 produces much lowered optical purity of the product due to racemization during distillation process.

Figure 6:
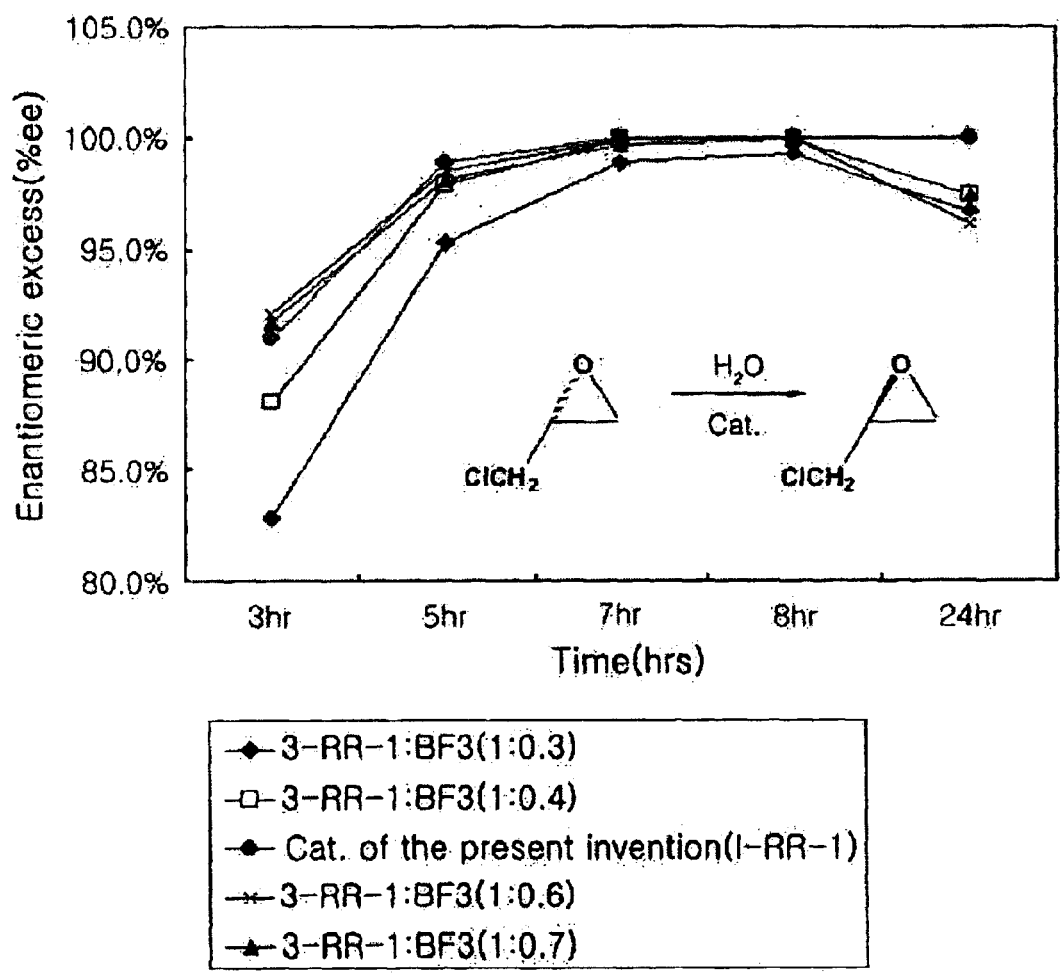
FIG. 6 is a graph comparing the difference in the reactivity of a representative chiral salen catalyst (I-RR-1) of the present invention and catalysts prepared by combining chiral salen ligand (3-RR-1) and boron trifluoride in varied ratios.

FIG. 6 is a graph comparing the difference in the reactivity of a representative chiral salen catalyst (I-RR-1) of the present invention and catalysts prepared by combining chiral salen ligand (3-RR-1) and boron trifluoride in varied ratios. In FIG. 6, it is noted that the reaction employed with chiral salen catalyst of the present invention exhibits faster reaction and less racemization than that using the others.

(3-RR-1)

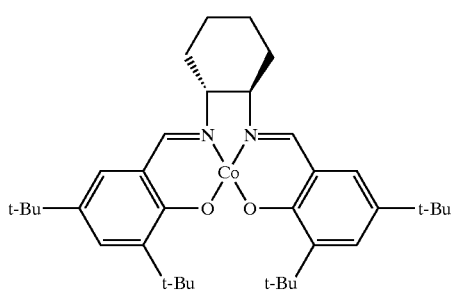

Figure 7:
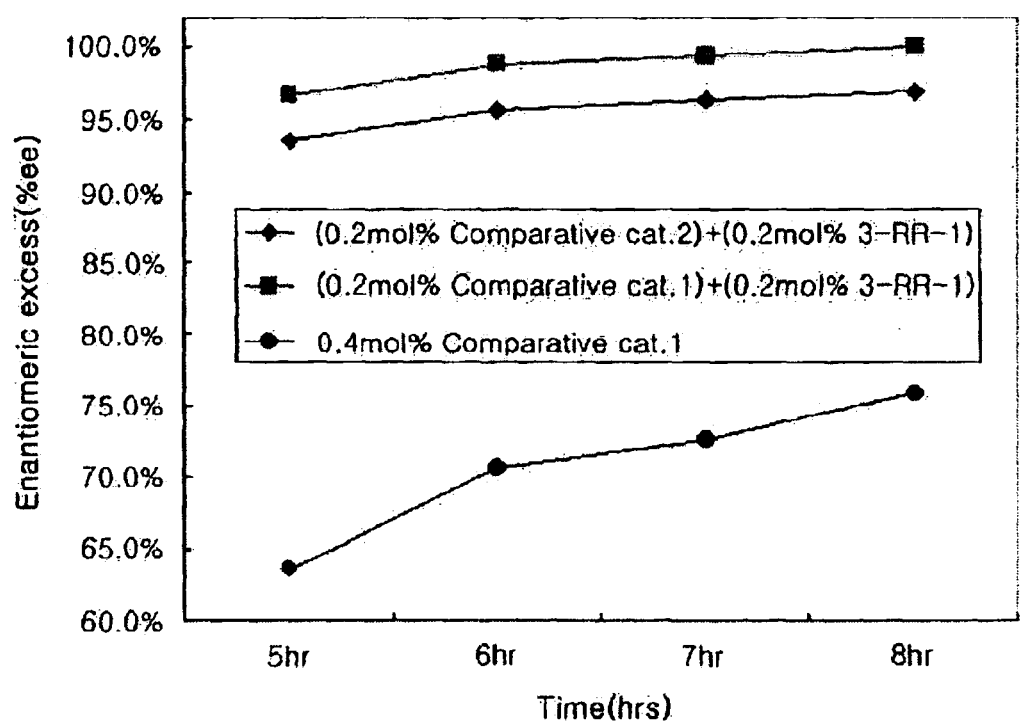
FIG. 7 is a graph comparing the difference in the reactivity of a representative chiral salen catalyst (I-RR-1) of the present invention prepared by mixing a comparative catalyst 1 and a chiral salen ligand (3-RR-1) in the same number of moles to have a ratio between ligand and $BF_3$ of 2:1, and a mixture of a comparative catalyst 2 and a chiral salen ligand (3-RR-1) in the same number of moles to have a ratio between ligand and OAc of 2:1, and a comparative catalyst 1.

FIG. 7 is a graph comparing the difference in the reactivity of chiral salen catalyst prepared by mixing a comparative catalyst 1 with the same mole of chiral salen ligand (3-RR-1) and a comparative catalyst prepared by mixing a comparative catalyst 2 with the same mole of chiral salen ligand (3-RR-1) to be the ratio of ligand and $BF_3$ (or OAc) of 2:1 in order to have the same structure of the chiral salen catalyst of the present invention comprising two molecules of chiral salen ligand and one molecule of $BF_3$. In FIG. 7, the chiral salen catalyst prepared by mixing a comparative catalyst 1 with the same mole of chiral salen ligand (3-RR-1) exhibits superior efficiency when the ratio of Co(salen) represented by formula 3-RR-1 and $BF_3$ is 2:1 unlike the comparative catalyst 2. Therefore, it duly illustrates that the chiral salen catalyst of the present invention (I-RR-1) has not only a different 3-dimensional structure from the conventional chiral salen catalyst but also a different reaction mechanism where $BF_3$ participates from the conventional ones.

Figure 8:
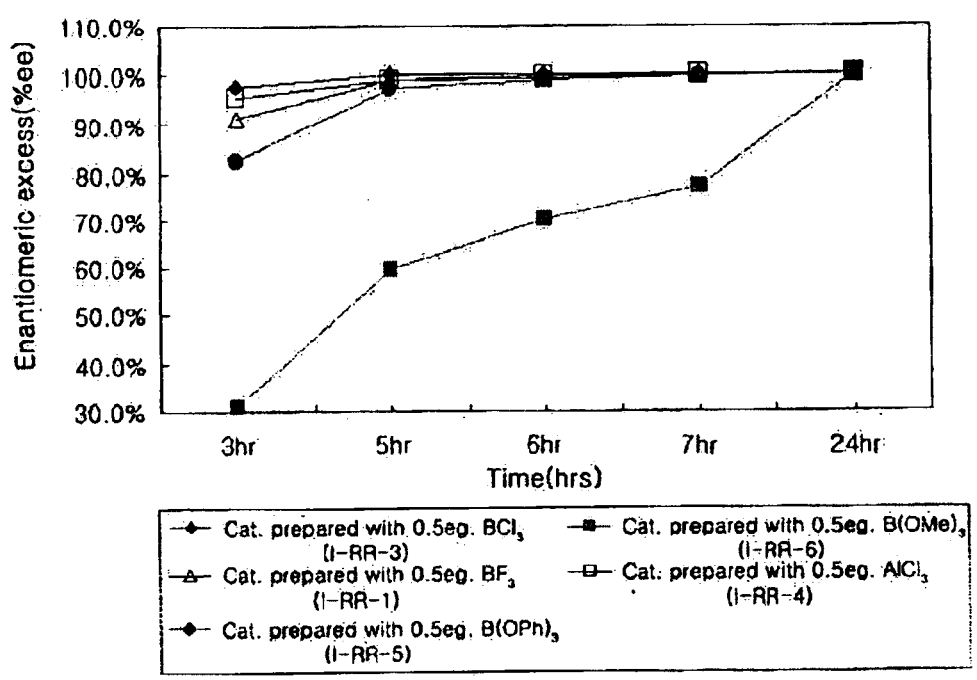
FIG. 8 is a graph comparing the difference in the reaction rate by employing a chiral salen catalyst comprising chiral salen ligands (3-RR-1) and each one of $BF_3$, $BCl_3$, $AlCl_3$, $B(OPh)_3$, and $B(OMe)_3$ mixed in a ratio of 2:1 over reaction time.
Figure 9:
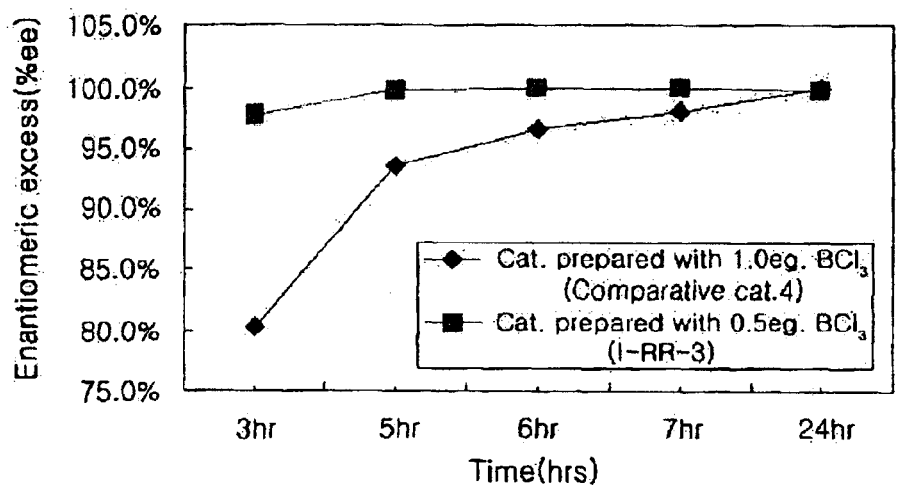
FIG. 9 is a graph comparing the difference in the reaction rate by employing a catalyst comprising chiral salen ligand (3-RR-1) and $BCl_3$ mixed in a ratio of 2:1 and a comparative catalyst comprising chiral salen ligand(3-RR-1) and $BCl_3$ mixed in a ratio of 1:1 which has the same 3-dimensional structure as the conventional catalyst.
Figure 10:
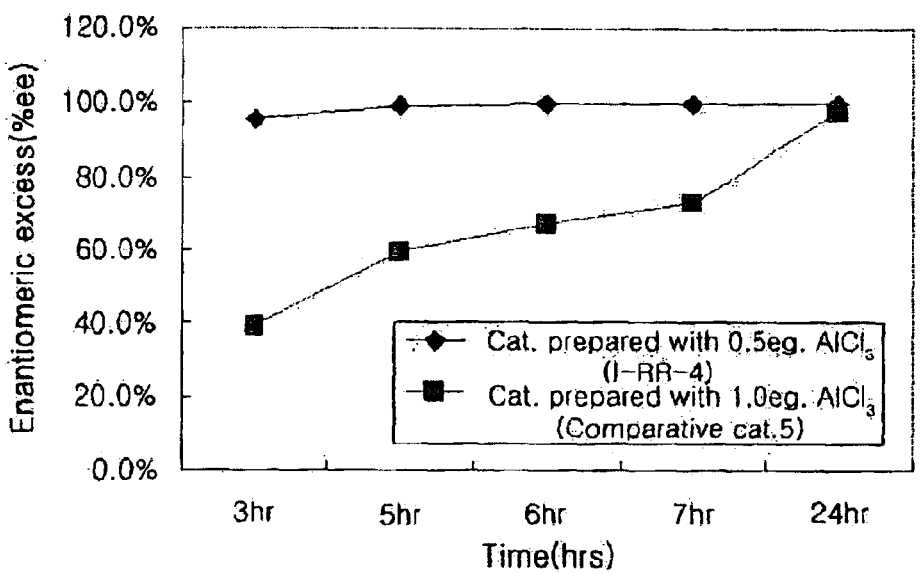
FIG. 10 is a graph comparing the difference in the reaction rate by employing a catalyst comprising chiral salen ligand (3-RR-1) and $AlCl_3$ mixed in a ratio of 2:1 and a comparative catalyst comprising chiral salen ligand(3-RR-1) and $AlCl_3$ mixed in a ratio of 1:1 which has the same 3-dimensional structure as the conventional catalyst.

FIG. 8 is a graph comparing the difference in the reaction rate by employing a chiral salen catalyst comprising two molecules of chiral salen ligands (3-RR-1) and one molecule of $BF_3$, $BCl_3$, $AlCl_3$, $B(OPh)_3$, or $B(OMe)_3$ mixed in a ratio of 2:1. FIG. 9 is a graph comparing the difference in the reaction rate by employing the catalyst comprising chiral salen ligand(3-RR-1) and $BCl_3$ mixed in a ratio of 2:1 and a comparative catalyst comprising chiral salen ligand(3-RR-1) and $BCl_3$ mixed in a ratio of 1:1 which has the same 3-dimensional structure as the conventional catalyst. FIG. 10 is a graph comparing the difference in the reaction rate by employing the catalyst comprising chiral salen ligand(3-RR-1) and $AlCl_3$ mixed in a ratio of 2:1 and a comparative catalyst comprising chiral salen ligand(3-RR-1) and $AlCl_3$ mixed in a ratio of 1:1 which has the same 3-dimensional structure as the conventional catalyst. In FIG. 8, it is noted that the chiral salen catalysts having 6 valence electrons such as B and Al are more effective. Compared with $BF_3$, $BCl_3$, $AlCl_3$, the chiral salen catalysts prepared by employing $B(OMe)_3$, which has a weak strength in withdrawing electrons, or $B(OPh)_3$, which has a bulky group, shows a relatively slow reaction rate. Further, in FIGS. 9 and 10, the chiral salen catalysts of the present invention exhibit remarkably faster reaction rate compared to ones having the same 3-dimensional structure as the conventional catalyst. It illustrates that the chiral salen catalysts of the present invention have a sandwich configuration which is a different structure from the conventional catalysts and the role of $BF_3$, $BCl_3$, $AlCl_3$, $B(OPh)_3$ and $B(OMe)_3$ located in the center is very important.

Hereunder is given the more detailed description of the present invention using examples. However, it should not be construed as limiting the scope of the present invention.

EXAMPLE 1

Preparation of I-SS-1

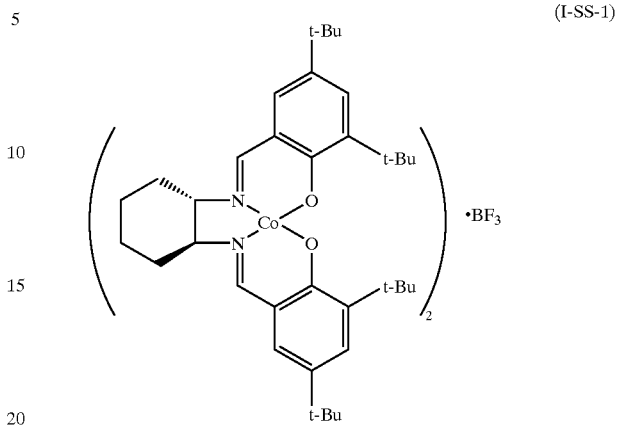

(I-SS-1)

1 equivalent of (S,S)-N,N'-bis(3,5-di-t-butylsalicylidene)-1,2-cyclohexanediamine and 1.2 equivalents of cobalt(II) acetate·$4H_2O$ were mixed to ethanol and refluxed for 5 hrs while stirring. The reaction mixture was filtered and washed with small amount of ethanol. The obtained solid was mixed with 0.5 equivalent of boron trifluoride·$2H_2O$ in dichloromethane, and the reaction mixture was stirred at room temperature for 4 hours. Dichloromethane was removed under reduced pressure to produce the target compound.

IR 70, 1010, 1070, 1100, 1220, 1270, 1360, 1560, 1720 $cm^{-1}$;

UV/Vis 360 nm;

$^{13}C$ NMR($CDCl_3$, ppm) δ17.62, 22.33, 24.42, 29.57, 31.51, 32.34, 33.70, 42.93, 47.03, 56.53, 82.37, 92.93, 97.47, 126.18;

$^{19}F$ NMR($CDCl_3$) ($CFCl_3$, ppm) δ−87.62;

$^{11}B$ NMR($CDCl_3$)($BF_3$, ppm) δ 0.31; and

Anal calcd. ($C_{72}H_{104}N_4O_4Co_2·BF_3·3H_2O$) C 65.1, H 8.3, N 4.2, Found C 65.4, H 8.5, N 4.2

Example 2

Preparation of I-RR-1

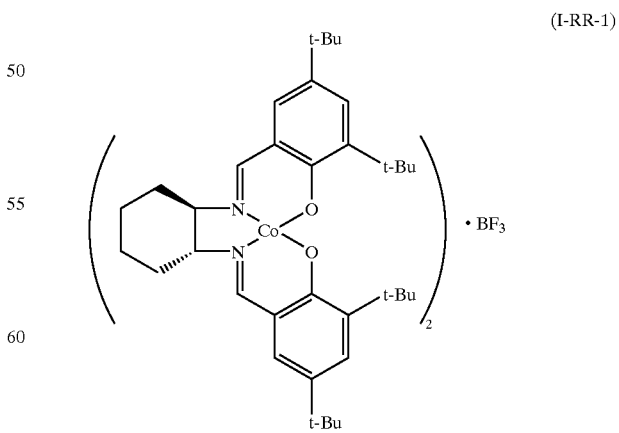

(I-RR-1)

a) The reaction was performed the same as in the above Example 1 except that instead of (S,S)-N,N'-bis(3,5-di-t- butylsalicylidene)-1,2-cyclohexanediamine, (R,R)-N,N'-bis(3,5-di-t-butylsalicylidene)-1,2-cyclohexanediamine was used to obtain the target product.

IR 970, 1010, 1070, 1100, 1220, 1270, 1360, 1560, 1720 cm$^{-1}$;

UV/Vis 360 nm;

$^{13}$C NMR(CDCl$_3$, ppm) δ 17.62, 22.33, 24.42, 29.57, 31.51, 32.34, 33.70, 42.93, 47.03, 56.53, 82.37, 92.93, 97.47, 126.18;

$^{19}$F NMR(CDCl$_3$) (CFCl$_3$, ppm) δ−87.62;

$^{11}$B NMR(CDCl$_3$) (BF$_3$, ppm) δ 0.31; and

Anal calcd. (C$_{72}$H$_{104}$N$_4$O$_4$Co$_2$·BF$_3$·3H$_2$O) C 65.1, H 8.3, N 4.2, found C 65.2, H 8.5, N 4.2 b) The reaction was performed the same as in the above Example 1 except that instead of (S,S)-N,N'-bis(3,5-di-t-butylsalicylidene)-1,2-cyclohexanediamine, (R,R)-N,N'-bis(3,5-di-t-butylsalicylidene)-1,2-cyclohexanediamine was used, and instead of 0.5 equivalent of boron trifluoride·2H$_2$O, 0.5 equivalents of boron trifluoride-acetate was used to obtain the target compound.

c) The reaction was performed the same as in the above Example 1 except that instead of (S,S)-N,N'-bis(3,5-di-t-butylsalicylidene)-1,2- cyclohexanediamine, (R,R)-N,N'-bis(3,5-di-t-butylsalicylidene)-1,2-cyclohexanediamine was used, and instead of 0.5 equivalents of boron trifluoride·2H$_2$O, 0.5 equivalents of boron trifluoride diethyl etherate was used to obtain the target compound.

EXAMPLE 3

Preparation of I-SS-2

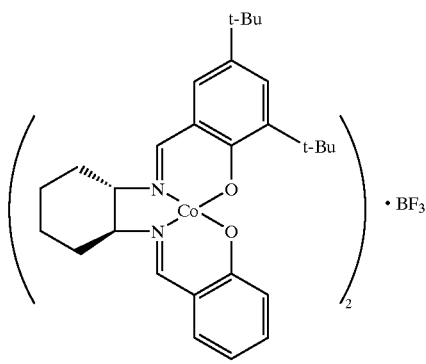
(I-SS-2)

The reaction was performed the same as in the above Eexample 1 except that instead of (S,S)-N,N'-bis(3,5-di-t-butylsalicylidene)-1,2-cyclohexanediamine, (S)-N-(3,5-di-t-butylsalicylidene)-(S)-N'(salicylidene)-1,2-cyclohexanediamine was used to obtain the target compound.

IR 970, 1010, 1070, 1100, 1220, 1270, 1360, 1560, 1720 cm$^{-1}$; and

UV/Vis 360 nm

EXAMPLE 4

Preparation of I-RR-2

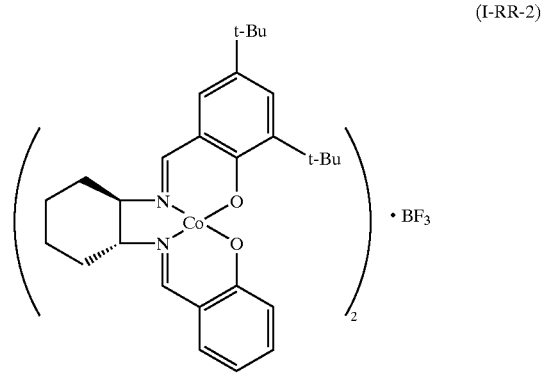
(I-RR-2)

The reaction was performed the same as in the above Example 1 except that instead of (S,S)-N,N'-bis(3,5-di-t-butylsalicylidene)-1,2-cyclohexanediamine, (R)-N-(3,5-di-t-butylsalicylidene)-(R)-N'-(salicylidene)-1,2-cyclohexanediamine was used to obtain the target compound.

IR 970, 1010, 1070, 1100, 1220, 1270, 1360, 1560, 1720 cm$^{-1}$; and

UV/Vis 360 nm

EXAMPLE 5

Preparation of (R,R)-N,N'-bis(3,5-di-t-butylsalicylidene)-1,2-cyclohexanediaminocobalt trifluoroboron

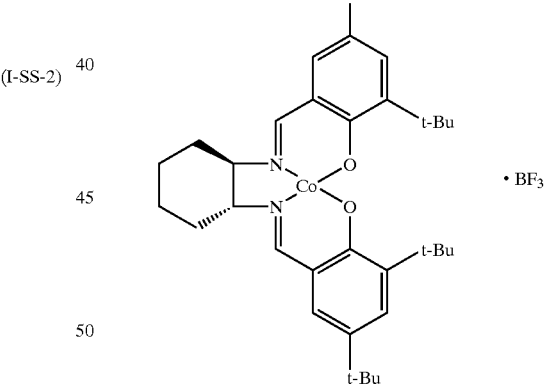

1 equivalent of (R,R)-N,N'-bis(3,5-di-t-butylsalicylidene)-1,2-cyclohexanediamine and 1.2 equivalents of cobalt(II)acetate·4H$_2$O were mixed into ethanol and refluxed for 5 hrs while stirring. The reaction mixture was filtered at room temperature and washed with small amount of ethanol. The obtained solid was mixed with 1.0 equivalent of boron trifluoride·2H$_2$O in dichloromethane, and the reaction mixture was stirred at room temperature for 4 hours. Dichlorimethane was removed under reduced pressure to produce the target compound.

IR(cm−1) :970, 1010, 1070, 1100, 1220, 1270, 1360, 1560, 1720 cm$^{-1}$;

UV/Vis 360 nm;

$^{13}$C NMR(CDCl$_3$, ppm) δ 17.62, 22.33, 24.62, 29.62, 31.37, 33.89, 42.69, 46.40, 48.00, 56.53, 82.37, 93.00, 97.47, 128.39;

$^{19}$F NMR(CDCl$_3$) (CFCl$_3$, ppm) δ−79.56; and $^{11}$B NMR(CDCl$_3$) (BF$_3$, ppm) δ 0.64

EXAMPLE 6

Preparation of (R,R)-N,N'-bis(3,5-di-t-butylsalicylidene)-1,2-cyclohexanediaminocobalt (III) bromide(Comparative Catalyst 3)

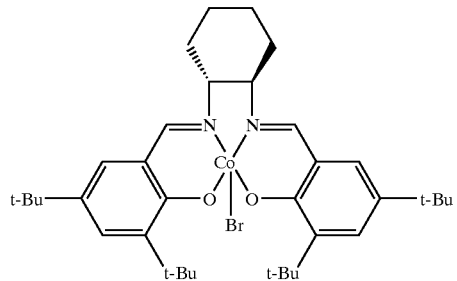

1 equivalent of (R,R)-N,N'-bis(3,5-di-t-butylsalicylidene)-1,2-cyclohexanediamine and 1.2 equivalents of cobalt(II)acetate·4H$_2$O were mixed into ethanol and refluxed for 5 hours while stirring. The reaction mixture was filtered at room temperature and washed with small amount of ethanol. The obtained solid was mixed with 0.5 equivalent of bromine in dichloromethane, and the reaction mixture was stirred at room temperature for 1 hour. Dichlorimethane was removed under reduced pressure to produce the target compound.

UV/Vis 360 nm

EXAMPLE 7

Preparation of (R,R)-N,N'-bis(3,5-di-t-butylsalicylidene)-1,2-cyclohexanediaminocobalt (III) Chloride

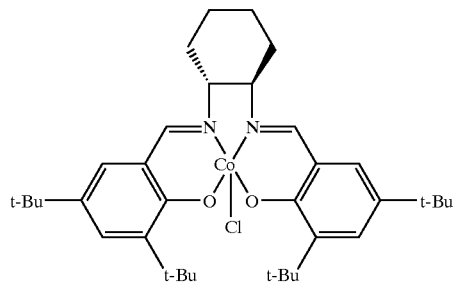

1 equivalent of (R,R)-N,N'-bis(3,5-di-t-butylsalicylidene)-1,2-cyclohexanediamine and 1.2 equivalents of cobalt(II)acetate·4H$_2$O were mixed into ethanol and refluxed for 5 hours while stirring. The reaction mixture was filtered at room temperature and washed with small amount of ethanol. The obtained solid was dissolved in dichloromethane and 0.5 equivalent of chlorine gas was injected. The reaction mixture was stirred at room temperature for 1 hour. Dichlorimethane was removed under reduced pressure to produce the target compound.

UV/Vis 360 nm

EXAMPLE 8

Preparation of (R,R)-N,N'-bis(3,5-di-t-butylsalicylidene)-1,2-cyclohexanediaminocobalt (III) Iodide

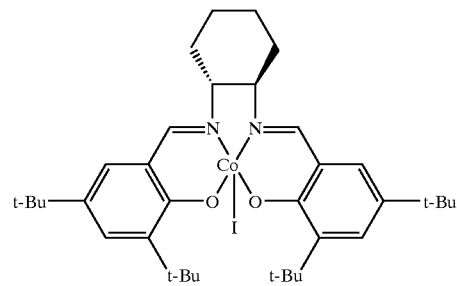

1 equivalent of (R,R)-N,N'-bis(3,5-di-t-butylsalicylidene)-1,2-cyclohexanediamine and 1.2 equivalent of cobalt(II)acetate·4H$_2$O were mixed into ethanol and refluxed for 5 hours while stirring. The reaction mixture was filtered at room temperature and washed with small amount of ethanol. The obtained solid was mixed with 0.5 equivalent of iodine in dichloromethane, and the reaction mixture was stirred at room temperature for 1 hour. Dichlorimethane was removed under reduced pressure to produce the target compound.

UV/Vis 360 nm

EXAMPLES 9–12

Preparation of I-RR-3~I-RR-6

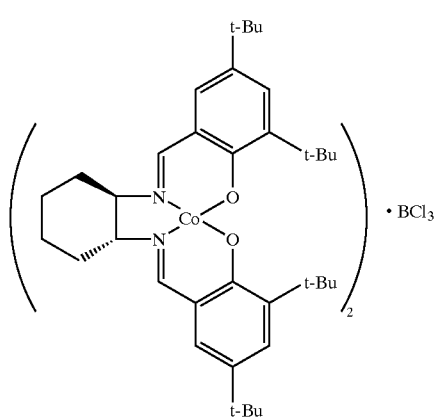

(I-RR-3)

19
-continued

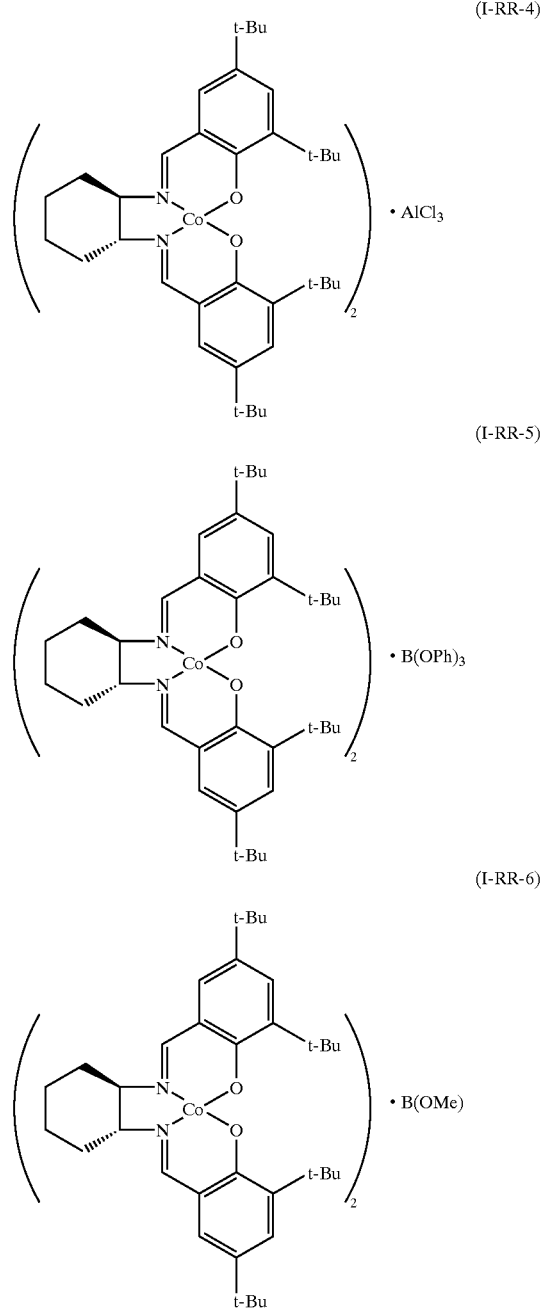

(I-RR-4)
(I-RR-5)
(I-RR-6)

As in Example 2, 1 equivalent of (R,R)-N,N'-bis(3,5-di-t-butylsalicylidene)-1,2-cyclohexanediamine and 1.2 equivalents of cobalt(II)acetate·4H$_2$O were mixed into ethanol and refluxed for 5 hours while stirring. The reaction mixture was filtered at room temperature and washed with small amount of ethanol. The obtained solid was mixed with 0.5 equivalent of boron trichloride (or aluminum chloride, or triphenyl borate, or trimethyl borate) in dichloromethane, and the reaction mixture was stirred at room temperature for 4 hours. Dichlorimethane was removed under reduced pressure to produce the target compound.

20

EXAMPLES 13–14

Preparation of (R,R)-N,N'-bis(3,5-di-t-butylsalicylidene)-1,2-cyclohexanediaminocobalt trichloroboron(Comparative Catalyst 4) and (R,R)-N,N'-bis(3,5-di-t-butylsalicylidene)-1,2-cyclohexanediaminocobalt trichloroaluminum (Comparative Catalyst 5)

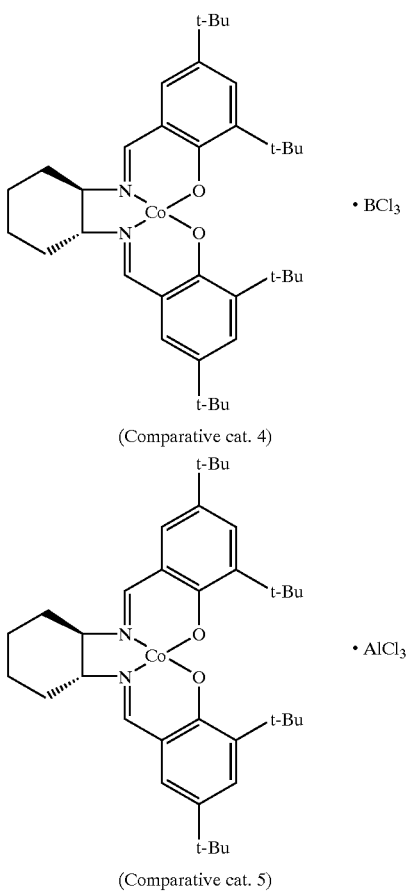

(Comparative cat. 4)

(Comparative cat. 5)

As in Example 5, 1 equivalent of (R,R)-N,N'-bis(3,5-di-t-butylsalicylidene)-1,2-cyclohexanediamine and 1.2 equivalents of cobalt(II)acetate·4H$_2$O were mixed into ethanol and refluxed for 5 hours while stirring. The reaction mixture was filtered at room temperature and washed with small amount of ethanol. The obtained solid was mixed with 0.5 equivalent of boron trichloride (or aluminum chloride) in dichloromethane, and the reaction mixture was stirred at room temperature for 4 hours. Dichlorimethane was removed under reduced pressure to produce the target compound.

EXPERIMENTAL EXAMPLE 1

Preparation of (R)-epichlorohydrin or (S)-epichlorohydrin

Each 100 g of racemic epichlorohydrin was added to 0.2 mol % of the catalyst prepared in Examples 1 to 4 as shown in Table 1 and cooled to 5° C. Each 13.6 g of water was slowly added to each reaction mixture and then stirred at 20° C. for 4 hrs. Each reaction mixture was performed for fractional distillation under vacuum to obtain (R)[or (S)]-epichlorohydrin (optical purity: 99.8% ee, yield: higher than 80%). Dichloromethane and water were added to the residue and the used catalyst was obtained from dichloromethane layer which was further evaporated under vacuum. The recovered catalyst without any activation process was reused for another hydrolysis reaction of racemic epichlorohydrin continuously to obtain (R) [or (S)]-epichlorohydrin with over 99.3% ee of optical purity (yield: higher than 80%) for more than 10 times.

COMPARATIVE EXPERIMENTAL EXAMPLE 1

Preparation of (S)-epichlorohydrin (S)-epichlorohydrin was prepared in the same manner as Experimental Example 1 by using 0.4 mol % of the conventional chiral salen catalyst having an acetate group (comparative catalyst 2). When the used catalyst was used for next reaction without any activation process, (S)-epichlorohydrin with 17% ee of optical purity was prepared. After the second reaction, the used catalyst was activated by a known method (*Science*, Vol. 277, 936, 1997). The used catalyst was added in toluene and 2 equivalents of acetic acid and stirred for 1 hour under atmosphere condition and the solvent was then evaporated under vacuum to obtain recovered catalyst. When the third reaction was performed by using the recovered catalyst, the reaction took 7 to 8 hours under the same reaction condition to obtain (S)-epichlorohydrin with lower than 99% ee of optical purity, while it took only 4 hours when the fresh catalyst was used. The result was summarized in Table 1.

TABLE 1

| catalyst | Nos. of times | Optical Purity | Average yield | Reaction time |
|---|---|---|---|---|
| Comparative cat.2 having OAc group) | 1 | >99.8 | 80% | 4 hr |
| | 2(w/o activation) | 17 | — | 8 hr |
| | 3(w/o activation) | 99.0 | 80% | 8 hr |
| I-SS-I (or I-RR-I) | 1 | >99.8 | 80.4% | 4 hr |
| | 4 | >99.8 | | 6 hr |
| | 8 | >99.8 | | 8 hr |
| | 10 | 99.4 | | 12 hr |
| I-SS-2(orI-RR-2) | 1 | >99.8 | 80.4% | 4 hr |
| | 4 | >99.8 | | 6 hr |
| | 8 | 99.6 | | 8 hr |
| | 10 | 99.3 | | 12 hr |

COMPARATIVE EXPERIMENTAL EXAMPLE 2

Comparison of Changes in Optical Purity of (S)-epichlorohydrin

Each 0.2 mol % of the catalyst prepared in Example 2 (I-PR-1), 0.4 mol % of the comparative catalyst 2 having an acetate group, and 0.4 mol % of the comparative catalyst 3 having a bromide group was added to 100 g of racemic epichlorohydrin separately and cooled to 5° C. 10.7 g of water was slowly added to each reaction mixture of which was stirred at 20° C. The optical purity of each reaction mixture was measured over reaction time as shown in FIG. 5.

EXPERIMENTAL EXAMPLE 2

Preparation of (S)-epichlorohydrin 0.2 mol % of the catalyst prepared in Example 5 and 0.2 mol % of the intermediate of formula 3-RR-I prepared in Example 2 were added to 100 g of racemic epibromohydrin. The reaction mixture was stirred for 10 minutes at room temperature and cooled to 5° C. 10.7 g of water was slowly added to the reaction mixture of which was stirred at 20° C. for 8 hours. The reaction mixture was performed for fractional distillation under vacuum to obtain (S)-epichlorohydrin with over 99.8% ee of optical purity(yield: higher than 80%).

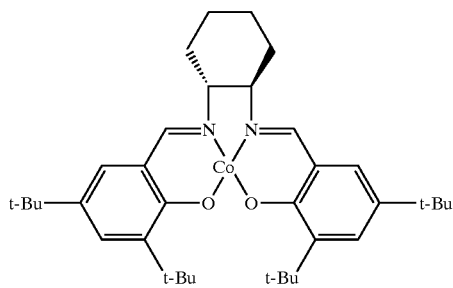

(3-RR-1)

EXPERIMENTAL EXAMPLE 3

Preparation of (S)-epichlorohydrin 0.2 mol % of the catalyst prepared in Examples 9–12 was respectively mixed with 100 g of racemic epichlorohydrin and the mixture was cooled to 5° C. 10.7 g of water was slowly added to the reaction mixture of which was stirred at 20° C. The reaction mixture was performed for fractional distillation under vacuum to obtain (S)-epichlorohydrin. The result was summarized in Table 2.

TABLE 2

| Catalyst | Reaction time | Optical Purity | Yield |
|---|---|---|---|
| I-RR-3 | 6 hrs | >99.8 | 81% |
| I-RR-4 | 7 hrs | >99.8 | 80% |
| I-RR-5 | 10 hrs | 99.6 | 78% |
| I-RR-6 | 24 hrs | 99.5 | 60% |

EXPERIMENTAL EXAMPLE 4

Preparation of (R)-epibromohydrin or (S)-epibromohydrin 2.8 g of the catalyst prepared in Example 1 (I-SS-1) or Example 2 (I-RR-1) was added to 148 g of racemic epibromohydrin and cooled to 5° C. 10.7 g of water was slowly added to the reaction mixture of which was stirred at 20° C. for 7 hours. The reaction mixture was performed for fractional distillation under vacuum to obtain (R) (or (S))-epibromohydrin. Dichloromethane and water were added to the residue and extracted out the used catalyst to the dichloromethane layer which was evaporated under vacuum to recover the used catalyst. The recovered catalyst was used for next reaction without any activation process to produce (R) (or (S))-epibromohydrin with over 99% ee of optical purity.

EXPERIMENTAL EXAMPLES 5–14

Preparation of (S)-1,2-epoxy or (R)-1,2-epoxy Compounds

The reaction was performed in the same manner as Experimental Example 4 except that 1.08 mol of racemic 1,2-epoxy compound was used instead of racemic epibromohydrin to obtain the target product as shown in Table 3 with over 99% ee of optical purity.

TABLE 3

R-epoxide →(0.2 mol % I-RR-1, 0.55 eq H₂O)→ R-epoxide →(0.2 mol % I-SS-1, 0.55 eq H₂O)→ R-epoxide

| Experimental example | R | Optical Purity(% ee) |
|---|---|---|
| 5  | Et       | >99% ee |
| 6  | n-Bu     | >99% ee |
| 7  | Cyclohexyl | >99% ee |
| 8  | Benzyl   | >99% ee |
| 9  | $CH_3CO$ | >99% ee |
| 10 | $PhOCH_2$ | >99% ee |
| 11 | $EtO_2CCH_2$ | >99% ee |
| 12 | 3-Butenyl | >99% ee |
| 13 | t-Bu     | >99% ee |
| 14 | $CF_3CH_2$ | >99% ee |

EXPERIMENTAL EXAMPLE 15

Preparation of (S)-styrene Oxide or (R)-styrene Oxide 7 g of the catalyst prepared in Example 1 (I-SS-1) or Example 2 (I-RR-1) was added to 130 g of racemic styrene oxide and cooled to 5° C. 13.6 g of water was slowly added to the reaction mixture, which was stirred at 20° C. for 15 hours. The reaction mixture was performed for fractional distillation under vacuum to obtain first (S)[or (R)]-styrene oxide with 99% ee of optical purity (yield: 70%). Dichloromethane and water were added to the residue and extracted out the used catalyst to the dichloromethane layer which was evaporated under vacuum to recover the used catalyst. The recovered catalyst was reused for next reaction without any activation process to produce (S) [or (R)]-styrene oxide with over 99% ee of optical purity.

EXPERIMENTAL EXAMPLE 16

Preparation of (R)-1,2-butandiol or (S)-1,2-butandiol 2.8 g of the catalyst prepared in Example 1 (I-SS-1) or Example 2 (I-RR-1) was added to 78 g of racemic 1,2-epoxybutane and cooled to 5° C. 5.8 g of water was slowly added to the reaction mixture, which was stirred at 20° C. for 3 hours. 1,2-epoxybutane remaining in the reaction mixture was removed under reduced pressure. Dichloromethane and water were added to the residue and the water layer was performed for fraction distillation to obtain (R) [or (S)]-1, 2-butandiol. The dichloromethane layer was evaporated under vacuum to recover the used catalyst. The recovered catalyst was reused for next reaction without any activation process to produce (R) (or (S))-1,2-butandiol with over 98% ee of optical purity (yield: 54%).

EXPERIMENTAL EXAMPLE 17

Preparation of (S)-epichlorohydrin in Mass-production 0.2 mol % of the catalyst prepared in Example 2 was mixed with 400 kg of racemic epichlorohydrin and cooled to 5° C. 42.8 kg of water was slowly added to the reaction mixture and stirred at 20° C. for 7 hours. The reaction mixture was performed for thin film evaporation under reduced pressure at a temperature of below 40° C. to obtain 160 kg of (S)-epichlorohydrin with 99.8% of optical purity (yield: 80%). 200 kg of dichloromethane and 200 kg of water were respectively added into the remaining residue and extracted out the used catalyst to the dichloromethane layer of which was washed twice with 200 kg of water. The washed dichloromethane layer was then evaported under reduced pressure to recover the catalyst. The recovered catalyst was contineously reused without any activation process for the next reaction to obtain (S)-epichlorohydrin with 99.8% ee of optical purity (yield: 80%).

INDUSTRIAL APPLICABILITY

As illustrated and set forth above, the chiral salen catalyst of the present invention has a different structure from that of the known chiral salen catalysts. Further, the chiral salen catalyst of the present invention can be reused without any activation process, which is a disadvantage associated with conventional chiral salen catalyst, and used effectively in mass production of chiral epoxides or chiral 1,2-dials from racemic epoxides in high yield and high optical purity by stereoselective hydrolysis.

What is claimed is:

1. A chiral salen catalyst represented by formula 1,

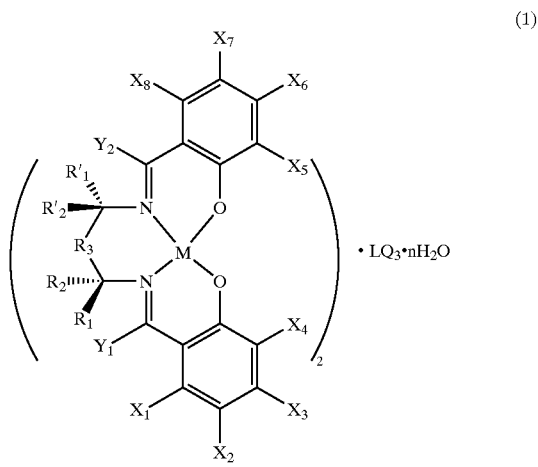

(1)

wherein $R_1$, $R_2$, $R'_1$, $R'_2$, $X_1$, $X_2$, $X_3$, $X_4$, $X_5$, $X_6$, $X_7$, $X_8$, $Y_1$ and $Y_2$ are independently H, $C_1$–$C_6$ alkyl group, $C_2$–$C_6$ alkenyl group, $C_2$–$C_6$ alkynyl group, $C_1$–$C_6$ alkoxy group, halogen atom, hydroxy group, amino group, thiol group, nitro group, amine group, imine group, amide group, carbonyl group, carboxy group, silyl group, ether group, thio ether group, seleno ether group, ketone group, aldehyde group, ester group, phosphoryl group, phosphonate group, phosphine group, sulfonyl group or $(CH_2)k$-$R_4$, wherein, $R_4$ is phenyl, cycloalkyl, cycloalkenyl, heterocycle or polycycle, and k is an integer of 0 to 8, or any two or more neighboring $R_1$, $R_2$, $R'_1$, $R'_2$, $X_1$, $X_2$, $X_3$, $X_4$, $X_5$, $X_6$, $X_7$, $X_8$, $Y_1$ and $Y_2$ form a ring of a carbocycle or heterocycle comprising 4 to 10 atoms;

$R_3$ is a direct bond, —$CH_2$—, —$CH_2CH_2$—, —NH—, —O—, or —S—;

M is a metal atom selected from Co, Cr, Mn, Fe, Mo and Ni;

L is B or Al, preferably B;

Q is a halogen atom chosen from F, Cl, Br, and I, preferably F or Cl, and most preferably F; and n is an integer of 0 to 4.

2. The chiral salen catalyst of claim 1, wherein $X_1$, $X_2$, $X_3$, $X_4$, $X_5$, $X_6$, $X_7$, $X_8$, $Y_1$ and $Y_2$ are independently chosen from H, $C_1$–$C_6$ alkyl group and $C_1$–$C_6$ alkoxy group.

3. The chiral salen catalyst of claim 2, wherein $X_1$, $X_2$, $X_3$, $X_4$, $X_5$, $X_6$, $X_7$ and $X_8$ are independently H or t-butyl group; and both $Y_1$ and $Y_2$ are H.

4. The chiral salen catalyst of claim 1, wherein $R_1$ and $R'_1$ are combined to form $C_4$–$C_6$ carbocycle, and $R_2$ and $R'_2$ are H, $C_1$–$C_6$ alkyl group or $C_1$–$C_6$ alkoxy group; or $R'_1$ and $R_1$ are H, $C_1$–$C_6$ alkyl group or $C_1$–$C_6$ alkoxy group, and $R_2$ and $R'_2$ are combined to form $C_4$–$C_6$ carbocycle.

5. The chiral salen catalyst of claim 1, wherein $LQ_3$ is $BF_3$, $BCl_3$, $BBr_3$ or $AlCl_3$.

6. The chiral salen catalyst of claim 1, wherein $LQ_3$ is $BF_3$.

7. The chiral salen catalyst of claim 1, wherein M is Co.

8. The chiral salen catalyst of claim 1, wherein said catalyst is represented by the following formula 1a or 1b,

[formula 1a]

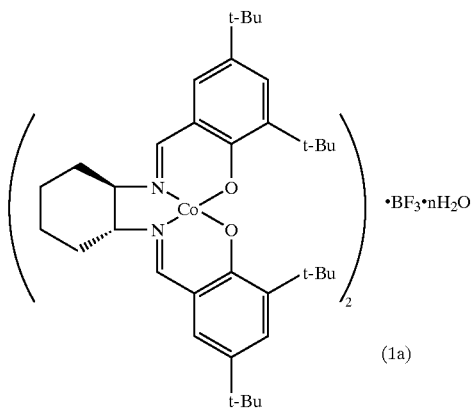

(1a)

[formula 1b]

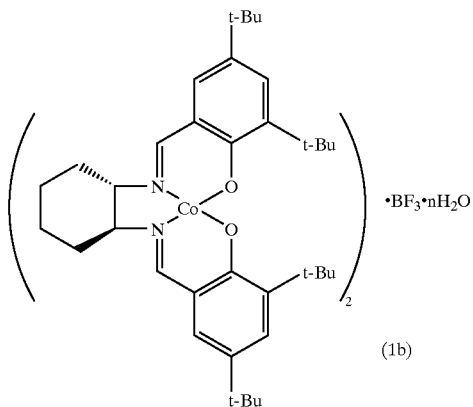

(1b)

wherein n is an integer of 0 to 4.

9. A method for the preparation of chiral salen catalyst of formula 1 of claim 1, wherein the compound of formula 3 is reacted with 0.5 equivalent of $LQ_3$,

[formula 3]

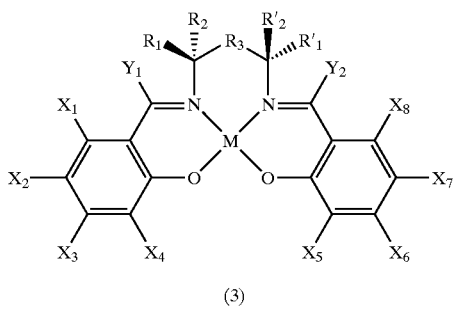

(3)

wherein, $R_1$, $R_2$, $R'_1$, $R'_2$, $X_1$, $X_2$, $X_3$, $X_4$, $X_5$, $X_6$, $X_7$, $X_8$, $Y_1$, $Y_2$, M, L and Q are as defined in claim 1.

10. The method for the preparation of chiral salen catalyst of claim 9, wherein said $X_1$, $X_2$, $X_3$, $X_4$, $X_5$, $X_6$, $X_7$, $X_8$, $Y_1$ and $Y_2$ are independently chosen from H, $C_1$–$C_6$ alkyl group and $C_1$–$C_6$ alkoxy group.

11. The method for the preparation of chiral salen catalyst of claim 10, wherein said $X_1$, $X_2$, $X_3$, $X_4$, $X_5$, $X_6$, $X_7$ and $X_8$ are independently H or t-butyl group; and both $Y_1$ and $Y_2$ are H.

12. The method for the preparation of chiral salen catalyst of claim 9, wherein $R_1$ and $R'_1$ are combined to form $C_4$–$C_6$ carbocycle, and $R_2$ and $R'_2$ are H, $C_1$–$C_6$ alkyl group or $C_1$–$C_6$ alkoxy group; or $R'_1$ and $R_1$ are H, $C_1$–$C_6$ alkyl group or $C_1$–$C_6$ alkoxy group, and $R_2$ and $R'_2$ are combined to form $C_4$–$C_6$ carbocycle.

13. The method for the preparation of chiral salen catalyst of claim 9, wherein $LQ_3$ is $BF_3$, $BCl_3$, $BBr_3$ or $AlCl_3$.

14. The method for the preparation of chiral salen catalyst of claim 9, wherein $LQ_3$ is $BF_3$.

15. The method for the preparation of chiral salen catalyst of claim 14, wherein boron trifluoride is added in a form of boron trifluoride derivative chosen from boron trifluoride dihydrate, boron trifluoride-acetic acid complex, boron trifluoride t-butyl methyl etherate, boron trifluoride dibutyl etherate, boron trifluoride diethyl etherate, boron trifluoride dimethyl etherate, boron trifluoride-ethylamine complex, boron trifluoride-methanol complex, boron trifluoride-methyl sulfide complex, boron trifluoride-phenol complex, boron trifluoride-phosphoric acid complex, boron trifluoride-propanol complex, and boron trifluoride-tetrahydrofuran complex.

16. The method for the preparation of chiral salen catalyst of claim 9, wherein M is Co.

17. The method for the preparation of chiral salen catalyst of claim 9, wherein said catalyst is represented by the following formula 1a or 1b,

[formula 1a]

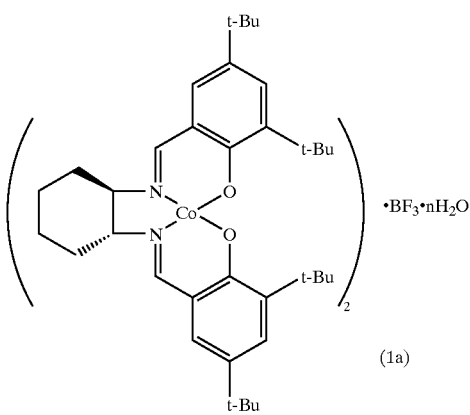

(1a)

[formula 1b]

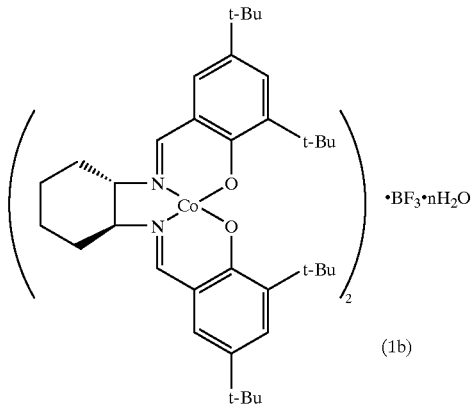

(1b)

wherein n is an integer of 0 to 4.

18. A method of preparing a chiral epoxide or chiral 1,2-diol by stereoselective hydrolysis of racemic epoxide comprising contacting said racemic epoxide with the chiral salen catalyst of formula 1 of claim 1.

19. The method of claim 18, wherein $X_1$, $X_2$, $X_3$, $X_4$, $X_5$, $X_6$, $X_7$, $X_8$, $Y_1$ and $Y_2$ are independently chosen from H, $C_1$–$C_6$ alkyl group and $C_1$–$C_6$ alkoxy group.

20. The method of claim 18, wherein $X_1$, $X_2$, $X_3$, $X_4$, $X_5$, $X_6$, $X_7$ and $X_8$ are independently H or t-butyl group; and both $Y_1$ and $Y_2$ are H.

21. The method of claim 18, wherein $R_1$ and $R'_1$ are combined to form $C_4$–$C_6$ carbocycle, and $R_2$ and $R'_2$ are H, $C_1$–$C_6$ alkyl group or $C_1$–$C_6$ alkoxy group; or $R'_1$ and $R_1$ are H, $C_1$–$C_6$ alkyl group or $C_1$–$C_6$ alkoxy group, and $R_2$ and $R'_2$ are combined to form $C_4$–$C_6$ carbocycle.

22. The method of claim 18, wherein $LQ_3$ is $BF_3$, $BCl_3$, $BBr_3$ or $AlCl_3$.

23. The method of claim 18, wherein $LQ_3$ is $BF_3$.

24. The method of claim 18, wherein M is Co.

25. The method of claim 18, wherein the said catalyst is represented by the following formula 1a or 1b,

[formula 1a]

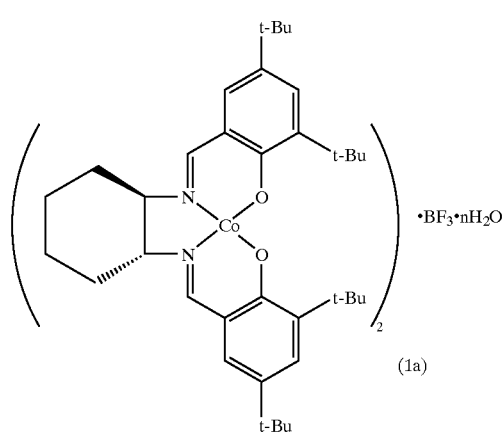

(1a)

[formula 1b]

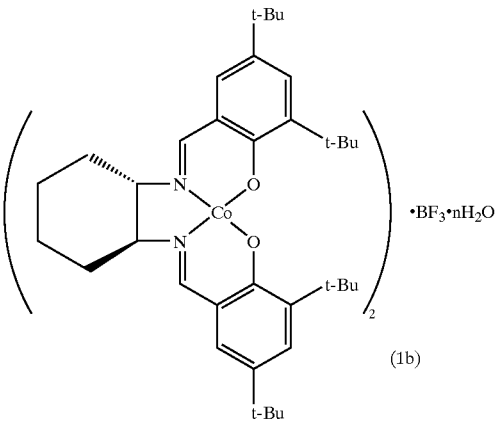

(1b)

wherein n is an integer of 0 to 4.

26. The method of claim 18, wherein said racemic epoxide is represented by the following formula 4,

[formula 4]

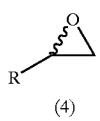

(4)

wherein R is $C_1$–$C_{10}$ alkyl group, $C_2$–$C_6$ alkenyl group, $C_2$–$C_6$ alkynyl group, $C_3$–$C_8$ cycloalkyl group, $C_1$–$C_{10}$ alkoxy group, phenyl group, carbonyl group, carboxy group, ketone group, aldehyde group, ester group, phosphoryl group, phosphonate group, phosphine group, sulfonyl group or $(CH_2)I$-$R_5$ (wherein, $R_5$ is $C_2$–$C_6$ alkenyl group, $C_2$–$C_6$ alkynyl group, $C_2$–$C_6$ alkoxy group, phenyl, cycloalkyl, cycloalkenyl, heterocycle, polycycle, halogen atom, hydroxy group, amino group, thiol group, nitro group, amine group, imine group, amide group, carbonyl group, carboxy group, silyl group, ether group, thioether group, seleno ether group, ketone group, aldehyde group, ester group, phosphoryl group, phosphonate group, phosphine group, sulfonyl group and I is an integer of 0 to 8).

27. The method of claim 18 comprising steps of
a) hydrolyzing racemic epoxide by reacting with water in the presence of said chiral salen catalyst of,
b) purifying the unreacted chiral epoxide or the hydrolyzed chiral 1,2-diol.

28. The method of claim 18, wherein said purified chiral compound is a unreacted chiral epoxide.

29. The chiral salen catalyst of claim 1, wherein L is B.

30. The chiral salen catalyst of claim 1, wherein Q is F or Cl.

31. The chiral salon catalyst of claim 1, wherein Q is F.

* * * * *

UNITED STATES PATENT AND TRADEMARK OFFICE
CERTIFICATE OF CORRECTION

PATENT NO. : 6,884,750 B2
DATED : April 26, 2005
INVENTOR(S) : Kim, Geon Joong et al.

It is certified that error appears in the above-identified patent and that said Letters Patent is hereby corrected as shown below:

Title page,
Item [57], ABSTRACT,
Line 8, the word "chirl" should read -- chiral --

Column 24,
Lines 58 and 60, "preferable B" and "preferable F or C1", and "most preferable F" should be deleted Column 28,
Line 51, change "catalyst of," to -- catayst, --
Line 60, the word "salon" should read -- salen --

Signed and Sealed this

Nineteenth Day of July, 2005

JON W. DUDAS
*Director of the United States Patent and Trademark Office*